United States Patent [19]

Moore

[11] Patent Number: 4,583,856

[45] Date of Patent: Apr. 22, 1986

[54] RESOLUTION SYSTEM FOR INTERFEROMETER

[75] Inventor: Robert C. Moore, Rochester, N.Y.

[73] Assignee: GCA Corporation, Bedford, Mass.

[21] Appl. No.: 507,750

[22] Filed: Jun. 27, 1983

[51] Int. Cl.[4] ............................................. G01B 9/02
[52] U.S. Cl. .................................. 356/358; 377/17; 377/42; 377/43; 377/53
[58] Field of Search ................. 356/345, 358, 363; 377/17, 42, 43, 45, 53

[56] References Cited

U.S. PATENT DOCUMENTS

| | | | |
|---|---|---|---|
| 3,564,218 | 2/1971 | Lay | 377/17 |
| 3,627,996 | 12/1971 | Vigour | 377/45 X |
| 3,661,464 | 5/1972 | Hubbard | 377/17 X |
| 3,794,814 | 2/1974 | Lay et al. | 377/17 |
| 3,976,379 | 8/1976 | Morokuma . | |

OTHER PUBLICATIONS

Courselle, "Electronic Fringe Counter", *IBM Tech. Discl. Bull.*, vol. 9, No. 3, pp. 269–271, Aug. 1966.

*Primary Examiner*—Davis L. Willis
*Assistant Examiner*—Matthew W. Koren
*Attorney, Agent, or Firm*—Stonebraker, Shepard & Stephens

[57] ABSTRACT

Analog-to-digital conversion and a computer produce finer resolution for interferometer distance measurement. The system applies to a laser interferometer producing two detected signals with voltages 19 and 20 that vary to form two sine waves in quadrature as interference fringes occur. A pair of analog-to-digital converters 21 and 22 converts each of these signals into digital values subdividing each sine wave fringe cycle into a plurality of increments. An up/down counter 25 supplied with a significant digit from each of the converters counts fringes corresponding to changes in path lengths. A computer 30 arranged with access to the fringe count and the digital increments determines a distance measurement based on the fringe count and a fine resolution of the distance measurement based on final values of the signals at any subdivided fringe cycle increments after changes in the path lengths.

4 Claims, 5 Drawing Figures

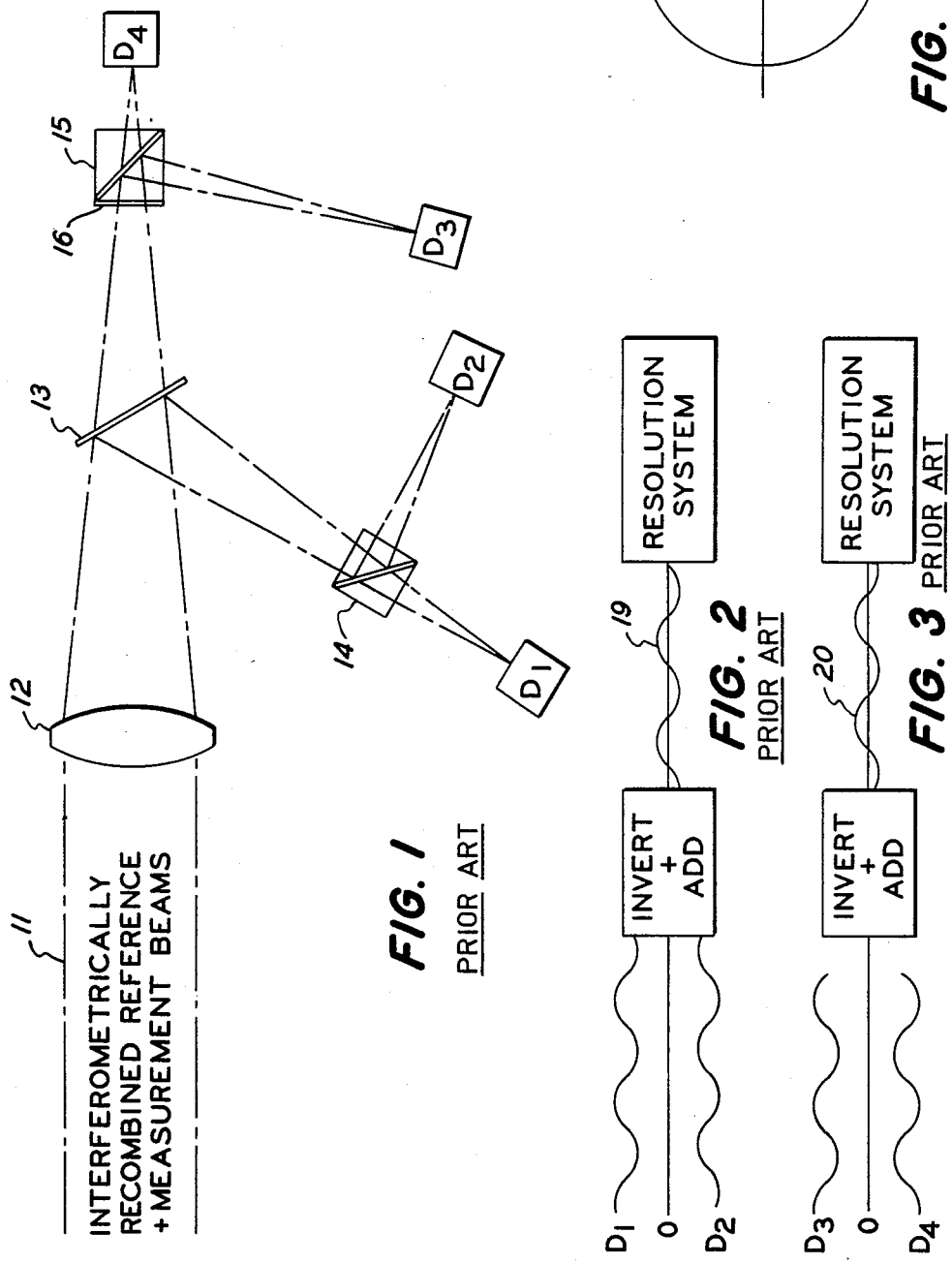

RESOLUTION SYSTEM FOR INTERFEROMETER

BACKGROUND

Interferometry can resolve distance measurement to the nearest fringe or half-wave length of the light being used, and with some arrangements, each fringe distance can be subdivided into quarters and possibly eighths. However, such resolution has involved comparators that are troublesome to keep in balance.

I have discovered a way of producing a much finer resolution for an interferometer distance measurement. My finer resolution system is also fast, accurate, and simple to maintain, compared to previous coarse systems.

SUMMARY OF THE INVENTION

My resolution system applies to a laser interferometer having an optical system producing two detected signals with voltages that vary to form two sine waves in quadrature as interference fringes occur from changes in path lengths between reference and measurement beams. A pair of analog-to-digital converters respectively receive said varying voltage signals and convert each signal to digital values subdividing each sine wave fringe cycle into a plurality of increments. An up/down counter supplied with a significant digit from each of said converters counts fringes corresponding to changes in the path lengths. A computer arranged with access to a fringe count output from the counter and to the digital increments from the converters determines from the fringe count a distance measurement based on a number of fringes occurring from changes in the path lengths and determines from the digital increments a fine resolution of the distance measurement based on final values of the signals at any subdivided fringe cycle increments after changes in the path lengths.

DRAWINGS

FIGS. 1-3 schematically show a generally known system for an interferometer detection system that produces two detected signals with voltages that vary to form two sine waves in quadrature as interference fringes occur from changes in path lengths between reference and measurement beams;

FIG. 4 is a diagram of a lissajous figure showing resolution points determined according to my invention; and FIG. 5 is a schematic diagram of a preferred embodiment of my resolution system.

DETAILED DESCRIPTION

Figure 5:
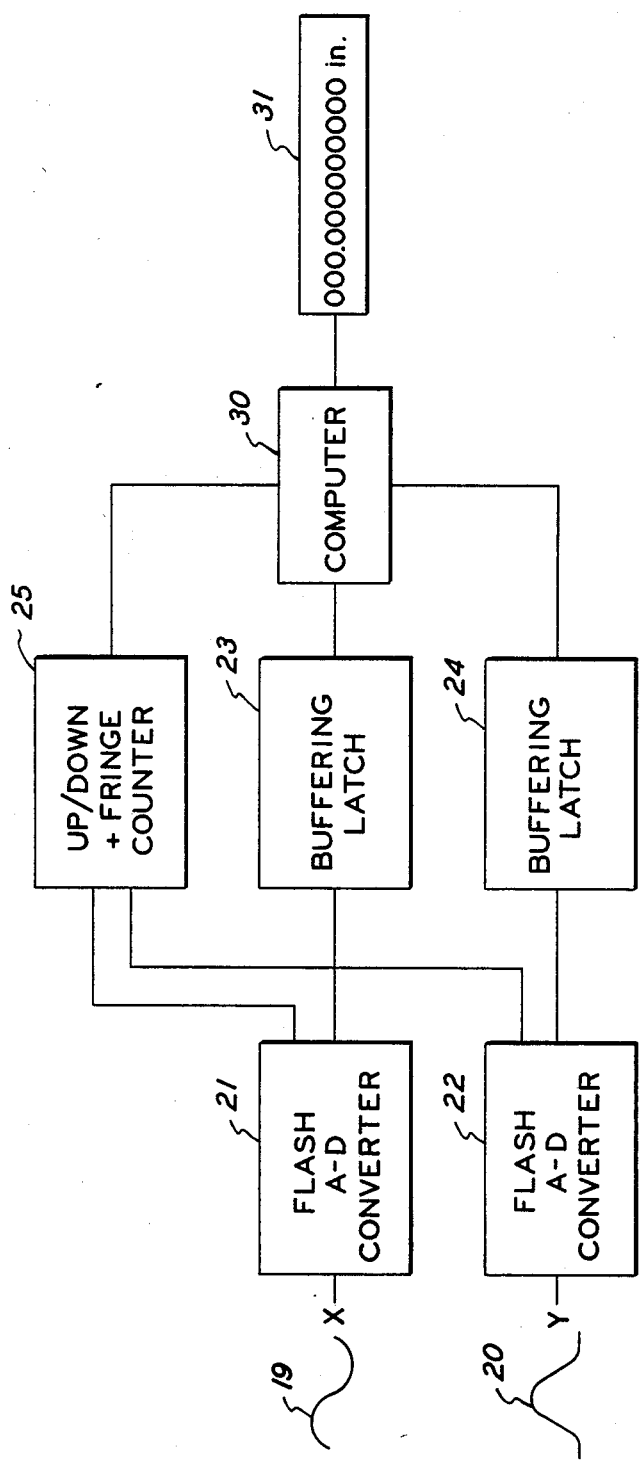

FIGS. 1-3 show a typical and generally known interferometer detection system for producing two sine waves in quadrature as interference fringes occur. Interferometrically recombined reference and measurement beams 11 are focused on an array of detectors $D_{1-4}$ by a lens 12. A beam splitter 13 divides the light between a pair of polarizing beam splitters 14 and 15, one of which includes quarter wave plate 16 placing the signals in quadrature. Polarizing beam splitters 14 and 15 divide each beam into complementary beams that are perpendicularly polarized relative to each other to produce a 180° phase difference at each pair of detectors $D_{1,2}$ and $D_{3,4}$. When signals from each pair of detectors are inverted and added as shown in FIGS. 2 and 3, they each produce a pure sine wave having no DC offset. Each of the sine waves 19 and 20 is a varying voltage signal that traces a wave cycle for each fringe change as path lengths vary between the reference and measurement beams. When applied to the X and Y plates of an oscilloscope, the two sine waves in quadrature form a lissajous figure as shown in FIG. 4 so that the varying voltages for each fringe movement trace a circle centered on the XY axis intersection.

Counting and resolution with such a system has previously been done with comparators that produce an electronic count each time the signal passes through zero or crosses an X or Y axis. This can produce eight counts per wave length of motion along the measurement beam. Signals can also be added and subtracted to produce counts whenever $X = Y$ or $X = -Y$ to produce an additional eight counts per wave length of motion. Keeping such an array of comparators in balance is cumbersome and troublesome, however, especially as more comparators are added to increase the resolution.

I have discovered that the two varying voltages 19 and 20 producing sine waves in quadrature can be digitally subdivided into increments that yield a much finer resolution. As shown in FIG. 5, I feed the quadrature signals 19 and 20 to flash A-D converters 21 and 22. These subdivide the varying voltage of each sine wave fringe cycle into a plurality of increments, depending on the bit capability of converters 21 and 22. Six bit converters, for example, divide each sine wave fringe cycle into 64 increments; and finer resolution is possible with eight bit and larger converters.

A significant digit such as a zero or axis crossing digit for each fringe cycle is fed to up/down and fringe counter 25, which counts fringes that occur as path lengths change between reference and measurement beams and determines from the quadrature relationship whether the count is increasing or decreasing. A fringe count output from counter 25 thus corresponds to distance changes in the measurement beam path in terms of whole fringe counts. This is more efficient than trying to count all the subdivided increments for each fringe as represented in the digital output of converters 21 and 22, and counting the entire digital stream from the converters would require that movement be relatively slow along the measurement beam path.

Buffering latches 23 and 24 receive the entire digital stream from converters 21 and 22 and synchronize the digital stream with the access rate of computer 30. Computer 30 is preferably a relatively fast microprocessor with a wide data path and an access rate in the kilohertz frequency range. Converters 21 and 22 produce a digital data stream in a megahertz frequency range, so that buffering latches 23 and 24 are preferred for holding data for an interval suitable for transfer to computer 30. Latches 23 and 24 can be octal latches receiving data from six bit converters and can increase in size to accommodate larger converters.

Computer 30 also receives a fringe count output from up/down counter 25 and determines coarse distances from that. Although fine resolution of subdivided increments of each fringe cycle is continuously computed during path length changes, this information is not significant until a path length change is completed and the measurement beam length stabilizes at a final distance. Then any fringe increment of motion that occurred beyond a whole fringe count can be determined by computer 30 and shown in display 31.

There are several ways that computer 30 can determine fine resolution of distances moved from the subdivided digital increments produced by converters 21 and 22. I prefer programming computer 30 to determine the phase angle of any incremental position within a fringe cycle, because phase angle is directly proportional to distance. This can be done readily with a look-up arc tangent table showing the phase angle for any voltage value. For example, point A in the lissajous figure of FIG. 4 has X and Y voltages forming a tangent relationship to a phase angle that is proportional to a distance increment within a fringe cycle. The X and Y voltages at point B have a tangent relationship to another phase angle for a different increment of distance. So with the aid of digital converters 21 and 22 and computer 30, a fine distance resolution can subdivide a single fringe representing a half-wave length of motion into numerous increments for a much more precise determination of distance. The improvement over existing systems is an increase in resolution by factor of 10, and my system can resolve distances to 0.1 millionths of an inch.

I claim:

1. A resolution system for a laser interferometer having an optical system producing two detected signals with voltages that vary to form two sine waves in quadrature as interference fringes occur from changes in path lengths between reference and measurement beams, said resolution system comprising:
   a. a pair of analog-to-digital converters respectively receiving said varying voltage signals and arranged for converting each signal into digital values subdividing each sine wave fringe cycle into a plurality of increments;
   b. an up/down counter supplied with a significant digit from each of said converters for counting fringes corresponding to said changes in path lengths; and
   c. a computer arranged with access to a fringe count output from said counter and to said digital increments from said converters for determining from said fringe count a distance measurement based on a number of fringes occurring from said changes in path lengths and for determining from said digital increments a fine resolution of said distance measurement based on final values of said signals at any subdivided fringe cycle increments after said changes in said path lengths.

2. The resolution system of claim 1 including a pair of buffering latches arranged for receiving said digital increments from said converters and synchronizing said access of said computer to said digital increments.

3. The resolution system of claim 1 wherein said computer is arranged for determining said fine resolution by determining phase angles for said final values of said signals.

4. The resolution system of claim 3 including a pair of buffering latches arranged for receiving said digital increments from said converters and synchronizing said access of said computer to said digital increments.

* * * * *